US012434481B2

(12) United States Patent
Oya et al.

(10) Patent No.: US 12,434,481 B2
(45) Date of Patent: Oct. 7, 2025

(54) ATTACHMENT AND PRINTING SYSTEM

(71) Applicant: SEIKO EPSON CORPORATION, Tokyo (JP)

(72) Inventors: Shun Oya, Kiso-machi (JP); Yoshihiro Koizumi, Shiojiri (JP); Tadahiro Mizutani, Shiojiri (JP); Takumi Nagashima, Matsumoto (JP)

(73) Assignee: SEIKO EPSON CORPORATION, Tokyo (JP)

( * ) Notice: Subject to any disclaimer, the term of this patent is extended or adjusted under 35 U.S.C. 154(b) by 197 days.

(21) Appl. No.: 18/529,220

(22) Filed: Dec. 5, 2023

(65) Prior Publication Data

US 2024/0184240 A1 Jun. 6, 2024

(30) Foreign Application Priority Data

Dec. 6, 2022 (JP) ................................ 2022-194680

(51) Int. Cl.
*B41J 2/175* (2006.01)

(52) U.S. Cl.
CPC .................................. *B41J 2/1752* (2013.01)

(58) Field of Classification Search
CPC ...................................................... B41J 2/1752
See application file for complete search history.

(56) References Cited

FOREIGN PATENT DOCUMENTS

| | | | |
|---|---|---|---|
| DE | 202004020894 U1 * | 3/2006 | .......... B41J 2/17523 |
| WO | 2019/098287 A1 | 5/2019 | |

* cited by examiner

*Primary Examiner* — Justin Seo
(74) *Attorney, Agent, or Firm* — Oliff PLC

(57) ABSTRACT

An attachment that is detachably mounted to a cartridge mounting unit of a printing apparatus, the cartridge mounting unit including a liquid introduction portion that receives a liquid, and a restricting mechanism that restricts a rotation movement of an incompatible cartridge in a rotation mounting direction to be mounted by interfering with the incompatible cartridge, the attachment including a release portion that releases restriction by the restricting mechanism by pushing a part of the restricting mechanism in a predetermined insertion direction, and a maintaining portion that maintains a mounted state of the attachment in cooperation with the cartridge mounting unit.

6 Claims, 10 Drawing Sheets

ATTACHMENT AND PRINTING SYSTEM

The present application is based on, and claims priority from JP Application Serial Number 2022-194680, filed Dec. 6, 2022, the disclosure of which is hereby incorporated by reference herein in its entirety.

BACKGROUND

1. Technical Field

The present disclosure relates to an attachment and a printing system.

2. Related Art

In the related art, there has been a liquid ejecting apparatus to which a cartridge is detachably mounted (for example, International Publication No. 2019-098287). In this liquid ejecting apparatus, when a cartridge is inserted into the liquid ejecting apparatus, a liquid supply port of the cartridge is coupled to a liquid introduction portion of the liquid ejecting apparatus. In addition, the liquid ejecting apparatus incudes an apparatus-side identification member that interferes with an incompatible cartridge so as to restrict further insertion of the cartridge. When an incompatible cartridge is inserted, through interference between the apparatus-side identification member and the incompatible cartridge, further insertion of the cartridge is restricted. On the other hand, when a compatible cartridge is inserted, the apparatus-side identification member and a cartridge-side identification member provided in the cartridge are fitted to each other, and the cartridge is mounted without interfering with the apparatus-side identification member.

However, in the case of the above-described cartridge, when the cartridge-side identification member is deformed by a shock due to falling, for example, the cartridge may not be able to be mounted to the liquid ejecting apparatus. Such a problem is not limited to a case where an apparatus-side identification member restricts a movement of an incompatible cartridge to be mounted. In addition, such a problem is not limited to a cartridge that is mounted through insertion, and is common to a cartridge that is mounted through a further movement of the cartridge after being inserted.

SUMMARY

According to an aspect of the present disclosure, an attachment that is detachably mounted to a cartridge mounting unit of a printing apparatus is provided. The cartridge mounting unit includes a liquid introduction portion that receives a liquid, and a restricting mechanism that restricts a rotation movement of an incompatible cartridge in a rotation mounting direction to be mounted by interfering with the incompatible cartridge. The attachment includes a release portion that releases restriction by the restricting mechanism by pushing a part of the restricting mechanism in a pre-determined insertion direction, and a maintaining portion that maintains a mounted state of the attachment in cooperation with the cartridge mounting unit.

DESCRIPTION OF EMBODIMENTS

A. First Embodiment

A-1. Configuration of Printing System

Figure 1:
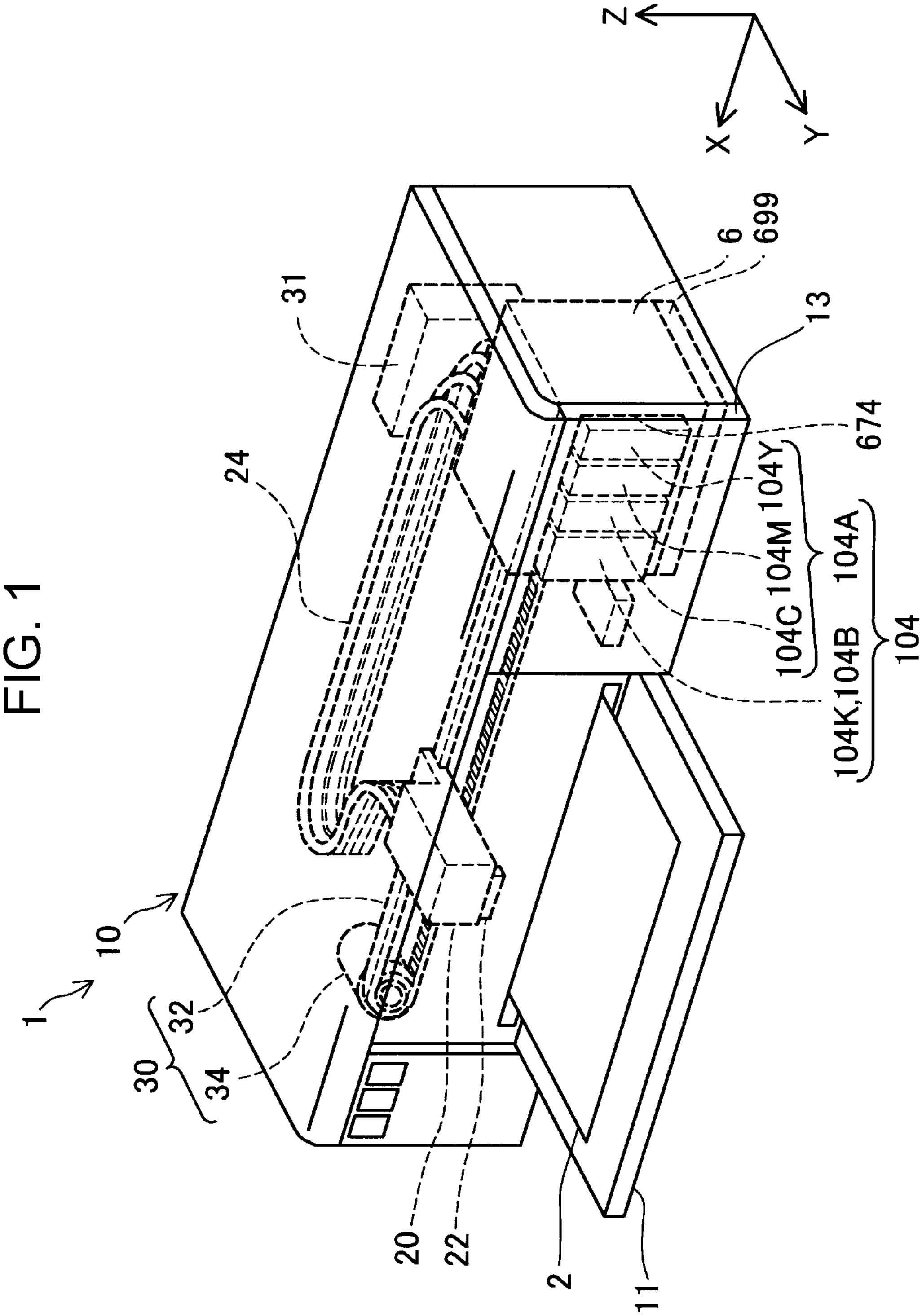
FIG. 1 is a perspective view illustrating a configuration of a printing system.

FIG. 1 is a perspective view illustrating a configuration of a printing system 1 as an embodiment of the present disclosure. In FIG. 1, X, Y and Z axes which are three orthogonal spatial axes are drawn. Directions in which arrows of the X-axis, the Y-axis, and the Z-axis are directed represent positive directions along the X-axis, the Y-axis, and the Z-axis, respectively. The positive directions along the X-axis, the Y-axis, and the Z-axis are denoted by a +X direction, a +Y direction, and a +Z direction, respectively. Reverse directions to the directions in which the arrows of the X-axis, the Y-axis, and the Z-axis are directed represent negative directions along the X-axis, the Y-axis, and the Z-axis, respectively. The negative directions along the X-axis, the Y-axis, the Z-axis are denoted by a −X direction, a −Y direction, and a −Z direction, respectively. Directions along the X-axis, the Y-axis, and the Z-axis regardless of whether being positive or negative are called an X direction, a Y direction, and a Z direction, respectively. The +Y direction and the −Y direction are also called a forward side and an inner side, respectively. This applies the same to the figures and description described later.

The printing system 1 includes a printing apparatus 10 as a liquid ejecting apparatus and a standard cartridge 104 that supplies ink as a liquid to the printing apparatus 10. Note that the printing system 1 can also have a special cartridge 204 described later in place of the standard cartridge 104. While the standard cartridge 104 has a standard release portion 503 described later, the special cartridge 204 does not have the standard release portion 503. Hereinafter, a case where the standard cartridge 104 is mounted to the printing system 1 is exemplified to describe the printing system 1.

The printing apparatus 10 of the present embodiment is an ink jet printer that discharges ink from a discharge head 22. The printing apparatus 10 is a large printer that performs printing on a large-sized sheet (for example, A2 to A0 sizes) such as a poster. The printing apparatus 10 includes a cartridge mounting unit 6, a carriage 20, the discharge head 22, a driving mechanism 30, and a control unit 31.

To the cartridge mounting unit 6, each of a plurality of standard cartridges 104 is detachably mounted. In the present embodiment, four types of single standard cartridges 104 respectively corresponding to four colors (black, yellow, magenta, and cyan) of ink, that is, a total of four standard cartridges 104 are mounted to the cartridge mounting unit 6. The standard cartridge 104 that stores black ink is also called a standard cartridge 104K, the standard cartridge 104 that accommodates yellow ink is also called a standard cartridge 104Y, the standard cartridge 104 that accommodates magenta ink is also called a standard cartridge 104M, and the standard cartridge 104 that accommodates cyan ink is also called a standard cartridge 104C. In the present embodiment, the standard cartridges 104C, 104M, and 104Y each have the same external shape. In addition, the standard cartridge 104K is configured to accommodate a larger amount of liquid than the standard cartridges 104C, 104M, and 104Y. Therefore, the standard cartridges 104C, 104M and 104Y are also called a first type standard cartridge 104A, and the standard cartridge 104K is also called a second type standard cartridge 104B.

The printing apparatus 10 has an exchange cover 13 as the front surface on the +Y direction side. When the +Z direction side of the exchange cover 13 is tilted toward the forward side, which is the +Y direction side, an insertion/removal opening 674 of the cartridge mounting unit 6 appears, and mounting and detaching of the standard cartridge 104 becomes possible. When the standard cartridge 104 is mounted to the cartridge mounting unit 6, the ink is able to be supplied to the discharge head 22 provided in the carriage 20 via a tube 24 as a liquid flow tube. In the present embodiment, the ink is supplied from the standard cartridge 104 to the discharge head 22 using a head difference. Specifically, the ink is supplied to the discharge head 22 by the head difference between the liquid surface of the ink in a liquid reservoir 699 and the discharge head 22. Note that in other embodiments, the ink may be supplied to the discharge head 22 through suction of the ink in the standard cartridge 104 by a pumping mechanism (not illustrated) of the printing apparatus 10. Note that the tube 24 is provided for each of the types of the ink. Note that a state in which the standard cartridge 104 is mounted to the cartridge mounting unit 6, and the ink as a liquid can be supplied to the printing apparatus 10 is also called a "mounted state".

The discharge head 22 is provided with a nozzle for each of the types of the ink. The discharge head 22 prints data such as text and images by discharging the ink toward a printing sheet 2. Note that in the present embodiment, the printing apparatus 10 is a printer called a so-called "off-carriage type" in which the cartridge mounting unit 6 is not linked to the movement of the carriage 20. The present disclosure may also be applied to a printer called a so-called "on-carriage type" in which the cartridge mounting unit 6 is provided in the carriage 20 and the cartridge mounting unit 6 is moved along with the carriage 20.

The control unit 31 performs control of each unit of the printing apparatus 10 and signal reception and transmission with the standard cartridge 104. The carriage 20 moves the discharge head 22 relative to the printing sheet 2.

The driving mechanism 30 reciprocates the carriage 20 based on a control signal from the control unit 31. The driving mechanism 30 includes a timing belt 32 and a driving motor 34. By transmitting the power of the driving motor 34 to the carriage 20 via the timing belt 32, the carriage 20 is reciprocated in a main scanning direction, which is a direction along the X direction. In addition, the printing apparatus 10 includes a transport mechanism for moving the printing sheet 2 in a sub-scanning direction, which is the +Y direction. When printing is performed, the printing sheet 2 is moved in the sub-scanning direction by the transport mechanism, and the printing sheet 2 on which printing has been completed is output onto a front surface cover 11.

In the present embodiment, in a use state of the printing system 1, the axis along the sub-scanning direction in which the printing sheet 2 is transported is referred to as the Y-axis, the axis along the direction of gravity is referred to as the Z-axis, the axis along the movement direction of the carriage 20 is referred to as the X-axis. Here, the "use state of the printing system 1" is referred to as a state in which the printing system 1 is installed on a horizontal surface. In addition, in the present embodiment, the sub-scanning direction is referred to as the +Y direction, the reverse direction thereto is referred to as the −Y direction, the direction of gravity is referred to as the −Z direction, and the direction of antigravity is referred to as the +Z direction. The X direction and the Y direction are directions along a horizontal direction. In addition, when the printing system 1 is viewed from the forward side, a direction directed from the right to the left is referred to as the +X direction, and the reverse direction thereto is the −X direction. In addition, in the present embodiment, the insertion direction in which the standard cartridge 104 is inserted to be mounted to the cartridge mounting unit 6 is referred to as the −Y direction, and the direction in which the standard cartridge 104 is removed from the cartridge mounting unit 6 is referred to as the +Y direction. Therefore, in the cartridge mounting unit 6, the −Y direction side is also called an inner side, and the +Y direction side is also called a forward side. In addition, in the present embodiment, the arrangement direction of the plurality of standard cartridges 104 is the X direction.

A-2. Cartridge Mounting Unit and Standard Cartridge in Mounted State

Figure 2:
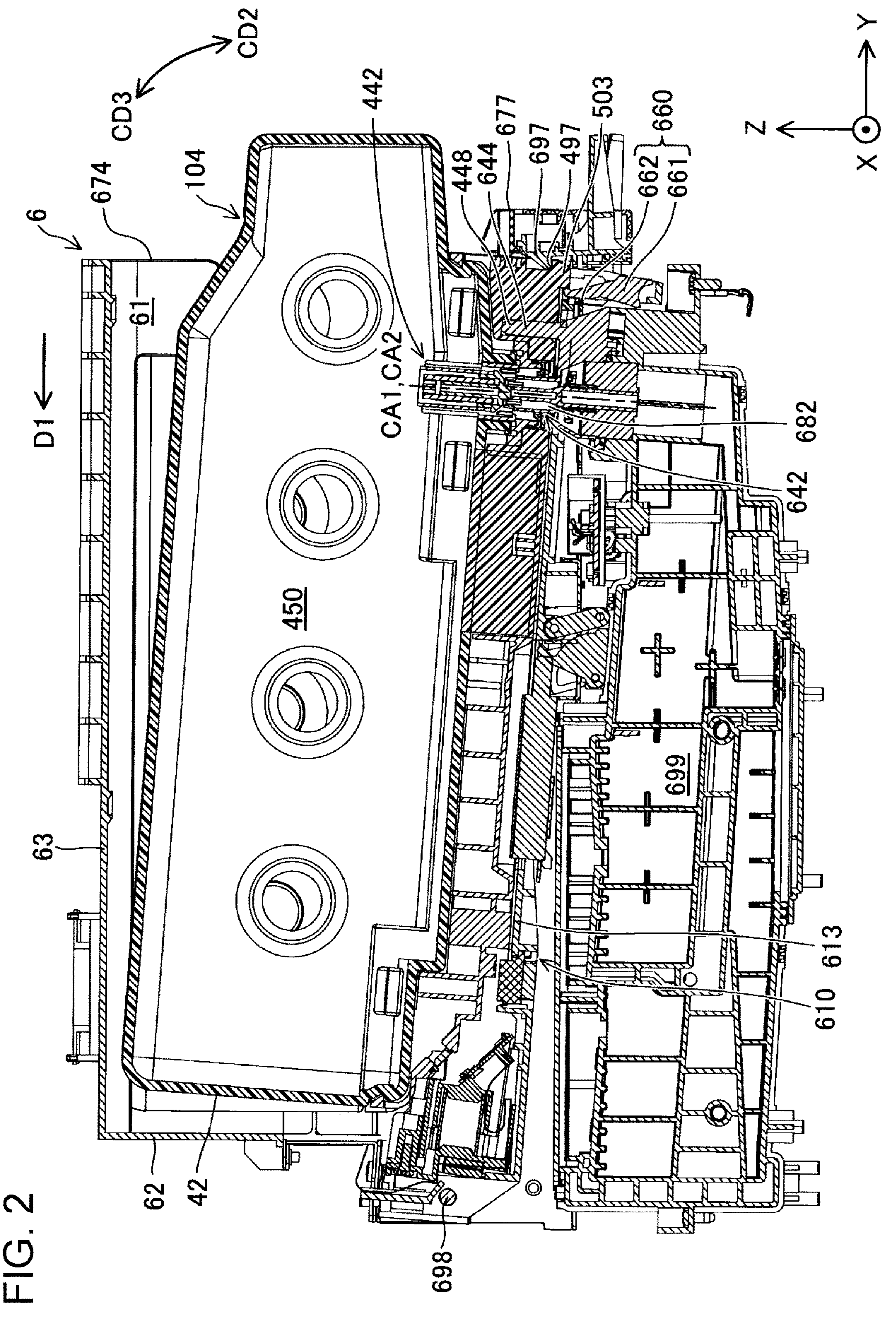
FIG. 2 is a sectional view of a standard cartridge and a cartridge mounting unit in a mounted state.

FIG. 2 is a sectional view of the standard cartridge 104 and the cartridge mounting unit 6 in the mounted state taken along a YZ plane passing through a central axis CA1 of a liquid introduction portion 642 as a cutting plane. As illustrated in FIG. 2, in the mounted state, the standard cartridge 104 is accommodated in an accommodation chamber 61 disposed in an upper part of the cartridge mounting unit 6.

The cartridge mounting unit 6 has the liquid reservoir 699 disposed below the accommodation chamber 61 and the liquid introduction portion 642. The accommodation chamber 61 has a supporting member 610 that forms an accommodation chamber bottom wall. The supporting member 610 has a main wall 613 that forms a bottom portion of the supporting member 610. The supporting member 610 is rotatably movable around a rotation fulcrum 698 provided near a second apparatus wall 62 of the cartridge mounting unit 6.

The liquid reservoir 699 is in communication with the discharge head 22 via the tube 24 illustrated in FIG. 1 and is also in communication with the liquid introduction portion 642. In the liquid reservoir 699, an air introducing port (not illustrated) for taking in air is formed. The liquid introduction portion 642 is a cylindrical member and has an introduction portion passage 682 through which a liquid passes. The liquid introduction portion 642 receives ink as a liquid.

In the mounted state in which the standard cartridge 104 is mounted to the cartridge mounting unit 6, the liquid supply portion 442 of the standard cartridge 104 is coupled to the liquid introduction portion 642 of the cartridge mounting unit 6. As a result, the ink accommodated in a liquid accommodating portion 450 of the standard cartridge

104 is supplied to the liquid introduction portion 642 via the liquid supply portion 442. In addition, in the present embodiment, while the ink is supplied from the liquid supply portion 442 to the liquid introduction portion 642, the air accommodated in the liquid reservoir 699 becomes bubbles, passes through the liquid introduction portion 642 and the liquid supply portion 442, and reaches the liquid accommodating portion 450. As a result, air-liquid exchange in the liquid accommodating portion 450 is performed. Note that in other embodiments, the standard cartridge 104 may have an air flow passage through which the liquid accommodating portion 450 is caused to be in communication with the outside so that air-liquid exchange is performed vie the air flow passage. In this case, the air flow passage is disposed at a position different from the liquid supply portion 442 and is formed, for example, in a wall forming the liquid accommodating portion 450.

The central axis CA1 of the liquid introduction portion 642 is parallel to a central axis CA2 of the liquid supply portion 442 in the mounted state and is inclined with respect to the Z direction. In addition, the central axis CA2 of the liquid supply portion 442 is a direction along a direction in which the liquid supply portion 442 extends.

A-3. Summary of Method for Mounting Cartridge

Figure 3:
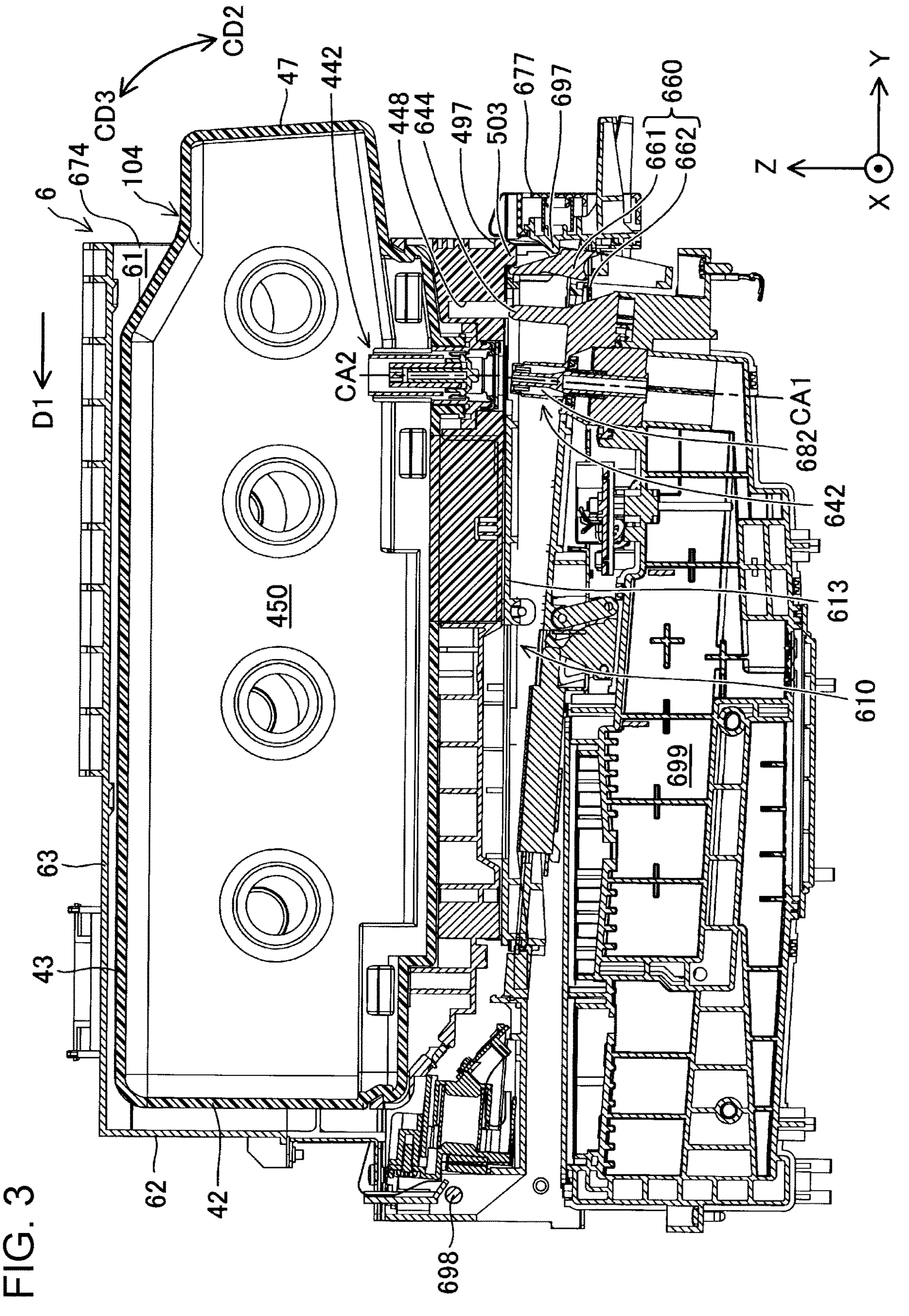
FIG. 3 is a view for explaining a mounting process of the standard cartridge.

FIG. 3 is a view for explaining a mounting process of the standard cartridge 104 to the cartridge mounting unit 6. As illustrated in FIG. 3, when the standard cartridge 104 is mounted to the cartridge mounting unit 6, first, the standard cartridge 104 is inserted into the accommodation chamber 61 from the insertion/removal opening 674 of the cartridge mounting unit 6 in the −Y direction, which is an insertion direction D1. As a result, the position of a front wall 42 of the standard cartridge 104 is determined.

After the insertion is completed so that the position of the front wall 42 of the standard cartridge 104 is determined, the standard cartridge 104 is moved in a rotation mounting direction CD2 indicated by the arrow around the rotation fulcrum 698 such that a rear wall 47 is moved downward. As a result, the liquid supply portion 442 of the standard cartridge 104 is coupled to the liquid introduction portion 642 of the cartridge mounting unit 6.

Note that when the standard cartridge 104 is removed from the cartridge mounting unit 6, the above-described procedures are performed in reverse order. That is, the standard cartridge 104 is rotated and moved in a rotation direction CD3 indicated by the arrow using the rotation fulcrum 698 as a fulcrum. Subsequently, the standard cartridge 104 is drawn from the accommodation chamber 61. The cartridge mounting unit 6 has a biasing member, at a position facing the supporting member 610, which biases the supporting member 610 in the mounted state substantially in the +Z direction. By the biasing member, the rotation movement of the standard cartridge 104 in the rotation direction CD3 is assisted. As shown in the state illustrated in FIG. 2, a state in which the liquid supply portion 442 of the standard cartridge 104 is coupled to the liquid introduction portion 642 of the cartridge mounting unit 6 is also called a mounted state. On the other hand, a state in which the liquid supply portion 442 of the standard cartridge 104 is not coupled to the liquid introduction portion 642 of the cartridge mounting unit 6 is also called a non-mounted state.

A-4. Detailed Configuration of Cartridge Mounting Unit

Figure 4:
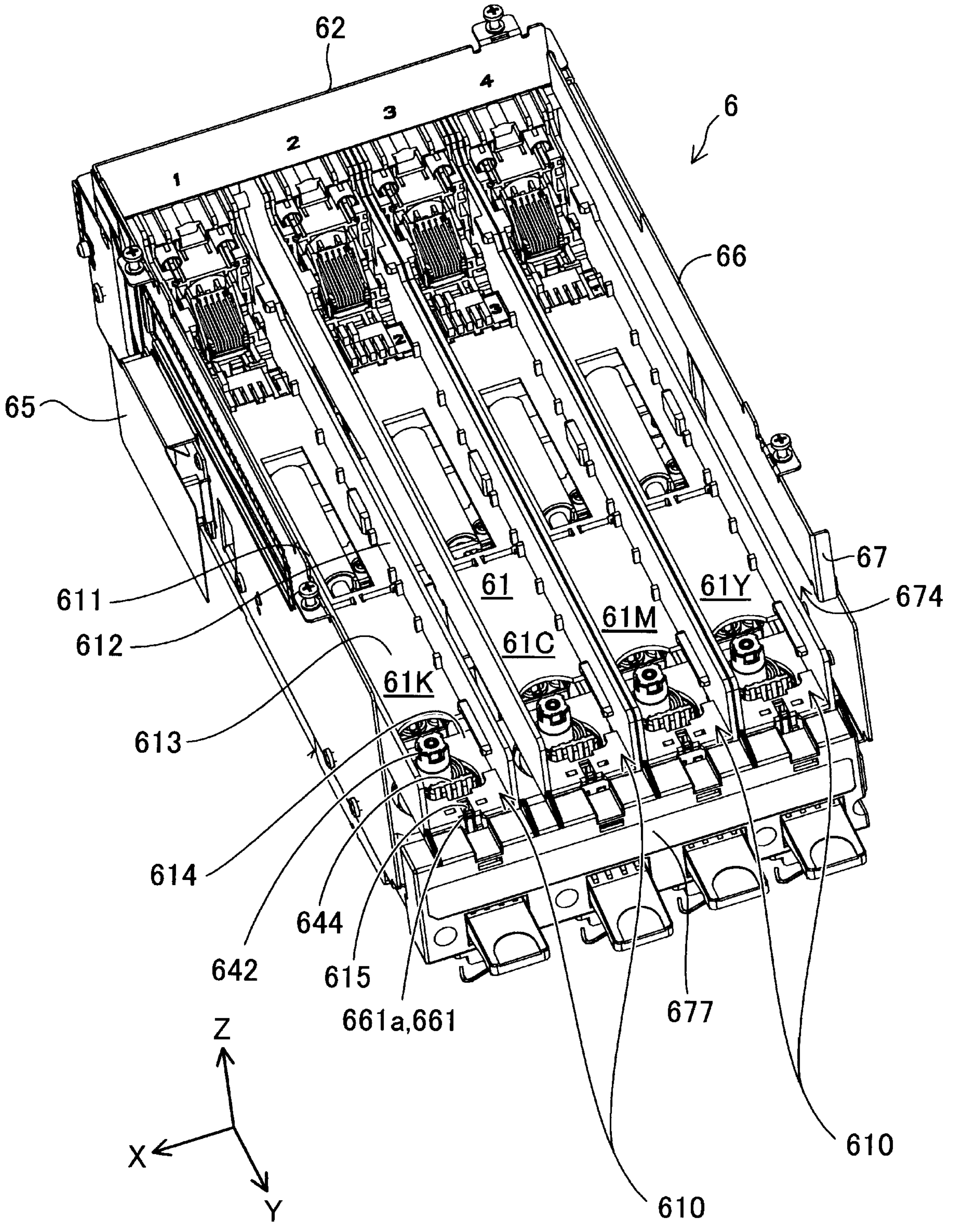
FIG. 4 is a perspective view of the cartridge mounting unit.

FIG. 4 is a perspective view of the cartridge mounting unit 6. In FIG. 4, for ease of understanding, a part of the configuration of the cartridge mounting unit 6 is omitted. Regarding the cartridge mounting unit 6, the X direction is also called a width direction, the Y direction is also called a depth direction, and the Z direction is also called a height direction. In the following description, unless otherwise specifically described about the state, each element will be described assuming that the cartridge mounting unit 6 is in an initial disposition state in which the standard cartridge 104 is not mounted to the cartridge mounting unit 6.

As illustrated in FIG. 3, the cartridge mounting unit 6 forms the accommodation chamber 61 that accommodates the standard cartridge 104 therein. The accommodation chamber 61 has a substantially rectangular parallelepiped shape. In the accommodation chamber 61, slots 61C, 61M, 61Y, and 61K that are portions for accommodating the standard cartridges 104C, 104M, 104Y, and 104K, respectively, substantially correspond to the external shapes of the standard cartridges 104C, 104M, 104Y, and 104K, respectively. In the present embodiment, in order to enable the standard cartridge 104K to accommodate a larger amount of liquid than the other standard cartridges 104C, 104M, and 104Y, the standard cartridge 104K is larger in size in the X direction. Therefore, in the present embodiment, the slot 61K is larger in width than the other slots 61C, 61M, and 61Y.

As illustrated in FIGS. 3 and 4, the cartridge mounting unit 6 has five apparatus walls 62, 63, 65, 66, and 67 that form the accommodation chamber 61, and four supporting members 610. In the present disclosure, a "wall" is a concept which includes, in addition to a single wall, a wall composed of a plurality of walls. The second apparatus wall 62 forms a wall of the accommodation chamber 61 on the −Y direction side. The second apparatus wall 62 is a substantially vertical wall in a use state of the printing apparatus 10.

As illustrated in FIG. 4, the first apparatus wall 67 faces the second apparatus wall 62 in the Y direction. The first apparatus wall 67 forms the insertion/removal opening 674 through which the standard cartridge 104 passes to be inserted to and removed from the accommodation chamber 61. As illustrated in FIG. 3, the apparatus upper wall 63 forms a wall of the accommodation chamber 61 on the +Z direction side. As illustrated in FIG. 4, the first apparatus side wall 65 forms a wall of the accommodation chamber 61 on the +X direction side. The second apparatus side wall 66 faces the first apparatus side wall 65 in the X direction and forms a wall of the accommodation chamber 61 on the −X direction side. The first apparatus side wall 65 and the second apparatus side wall 66 intersect with the second apparatus wall 62, the first apparatus wall 67, and the apparatus upper wall 63.

Four supporting members 610 are provided corresponding the number of the standard cartridges 104 that are mounted. The supporting members 610 face the apparatus upper wall 63 in the Z direction. The four supporting members 610 are arranged in the X direction. Each of the supporting members 610 is a member extending in the Y direction. The supporting member 610 has a main wall 613 serving as a mounting unit bottom wall, a first supporting side wall 611, and a second supporting side wall 612. The main wall 613 faces the apparatus upper wall 63 in the Z direction and forms a wall of the accommodation chamber 61 on the −Z direction side. The apparatus upper wall 63 and the main wall 613 intersect with the second apparatus wall 62 and the first apparatus wall 67. In the present disclosure, "intersect" means any state of (i) a state where two elements intersect with each other and actually intersect, (ii) a state where one element intersects with the other element when extending, and (iii) a state where mutual elements intersect with each other in a case where each of the mutual elements extends.

In an end portion of the main wall 613 near the first apparatus wall 67, an introduction opening 614 and an opening 615 are formed. The introduction opening 614 and the opening 615 penetrate the main wall 613 in the thickness direction of the main wall 613. The introduction opening 614 is provided so as to allow a leading end of the liquid introduction portion 642 and a leading end of an apparatus-side positioning portion 644 to be exposed. The opening 615 is located further on the +Y direction side than is the introduction opening 614. The opening 615 is provided so as to allow a leading end portion 661*a* of a rotation restricting portion 661 described later to be exposed.

The first supporting side wall 611 is erected in the +Z direction, which is the direction of antigravity, from an end portion on the +X direction side of the main wall 613. The second supporting side wall 612 is erected in the +Z direction from an end portion on the −X direction side of the main wall 613. The first supporting side wall 611 and the second supporting side wall 612 face each other in the X direction.

As illustrated in FIG. 3, the cartridge mounting unit 6 has a restricting mechanism 660. The restricting mechanism 660 is located further on the forward side than is the apparatus-side positioning portion 644. The restricting mechanism 660 has the rotation restricting portion 661 and an apparatus contact portion 662. Four rotation restricting portions 661 are provided corresponding to the four supporting members 610. The respective rotation restricting portions 661 are attached to the respective supporting members 610. The rotation restricting portions 661 are disposed on the forward side of the liquid introduction portion 642. The apparatus contact portion 662 is attached to cartridge mounting unit 6. Four apparatus contact portions 662 are provided corresponding to the number of the standard cartridges 104 that are mounted. As illustrated in FIG. 3, the respective rotation restricting portions 661 are disposed near the respective apparatus contact portions 662. As described later, each rotation restricting portion 661 restricts the movement of an incompatible cartridge to be mounted by interfering with the incompatible cartridge.

As illustrated in FIG. 3, the cartridge mounting unit 6 has, in addition to the above-described configuration, four apparatus-side positioning portions 644 and a projecting portion 697. The four apparatus-side positioning portions 644 are provided in end portions of the cartridge mounting unit 6 in the +Y direction corresponding to the number of the standard cartridges 104 that are mounted.

Each apparatus-side positioning portion 644 is disposed on the forward side of the liquid introduction portion 642. The apparatus-side positioning portion 644 has a substantially rectangular parallelepiped shape. When the apparatus-side positioning portion 644, which is a projection included in the cartridge mounting unit 6, enters a hollow portion of a hollow cartridge-side positioning portion 448 included in the standard cartridge 104, the movement by the liquid supply portion 442 to intersect with the central axis CA2 of the liquid supply portion 442 is restricted. As a result, positioning of the liquid supply portion 442 with respect to the liquid introduction portion 642 in a direction intersecting with the central axis CA1, which is an axis direction of the liquid introduction portion 642, is performed. In the initial disposition state of the cartridge mounting unit 6, the apparatus-side positioning portion 644 is not located in the accommodation chamber 61, but is located further on the −Z direction side than is the accommodation chamber 61. That is, the apparatus-side positioning portion 644 is located on an opposite side of the accommodation chamber 61 with the main wall 613 interposed therebetween. As a result, when the standard cartridge 104 is inserted into the accommodation chamber 61 of the cartridge mounting unit 6, the standard cartridge 104 can be prevented from colliding with the apparatus-side positioning portion 644.

As illustrated in FIG. 3, an engagement formation body 677 is formed further on the +Y direction side than the supporting member 610. In addition, the engagement formation body 677 is located further on the −Z direction side than the insertion/removal opening 674. The projecting portion 697 is formed on a surface of the engagement formation body 677 on the −Y direction side. The projecting portion 697 projects in the −Y direction from the surface of the engagement formation body 677 on the −Y direction side. In the mounted state of the standard cartridge 104, as illustrated in FIG. 2, the projecting portion 697 enters a cartridge recessed portion 497 that is recessed of the standard cartridge 104, and the projecting portion 697 and the cartridge recessed portion 497 are engaged with each other, thereby maintaining the mounted state.

A-5. Details of Restricting Mechanism

Figure 5:
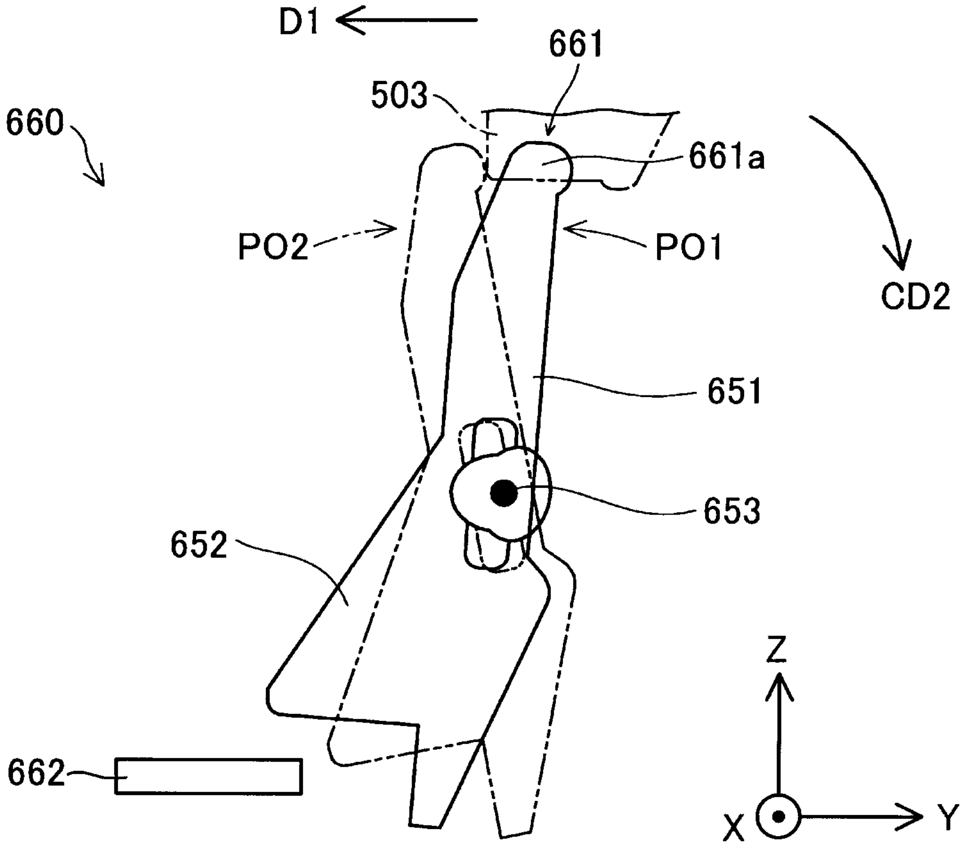
FIG. 5 is a view for explaining a restricting mechanism.

FIG. 5 is a view for explaining the restricting mechanism 660. The rotation restricting portion 661 illustrated in FIG. 5 is a flat plate member, the thickness direction of which is the X direction. The rotation restricting portion 661 has a first rotation restricting portion 651 and a second rotation restricting portion 652. The first rotation restricting portion 651 is a portion extending substantially in the Z direction when viewed in the X direction. The second rotation restricting portion 652 is a portion projecting in the −Y direction from the first rotation restricting portion 651. Near the center of the first rotation restricting portion 651 in the Z direction, a rotation pin 653 is inserted in the thickness direction. The rotation restricting portion 661 is rotatable using the rotation pin 653 as a fulcrum. In addition, by rotating, the rotation restricting portion 661 is movable between a restricting position PO1 indicated by the solid line and a release position PO2 indicated by the double-dotted line. By being biased by the biasing member (not illustrated), the rotation restricting portion 661 is maintained at the restricting position PO1 in a state of not being pushed by the standard release portion 503.

The apparatus contact portion 662 is disposed on a path through which the leading end of the second rotation restricting portion 652 at the restricting position PO1 passes in the process of the standard cartridge 104 being rotated and moved in the rotation mounting direction CD2. Therefore, in a state in which the rotation restricting portion 661 is located at the restricting position PO1, the leading end of the second rotation restricting portion 652 of the rotation restricting portion 661 interferes with the apparatus contact portion 662, and thus the rotation movement of the standard cartridge 104 in the rotation mounting direction CD2 is restricted. On the other hand, in a state in which the standard cartridge 104 is inserted into the insertion completion position, the leading end portion 661*a* of the first rotation restricting portion 651 in the +Z direction is pushed by the standard release portion 503 of the standard cartridge 104 described later, and the rotation restricting portion 661 is moved to the release position PO2 against the biasing force of the biasing member. In a state in which the rotation restricting portion 661 is located at the release position PO2, the leading end of the second rotation restricting portion 652 of the rotation restricting portion 661 does not interfere with the apparatus contact portion 662, and thus the standard cartridge 104 can be rotated and moved in the rotation mounting direction CD2 with the rotation restricting portion 661. Specifically, after the standard cartridge 104 is inserted, the bottom surface of an adapter portion 402 described later is rotated and moved in the rotation mounting direction CD2 while pushing the main wall 613 of the supporting member 610. Since the rotation restricting portion 661 is attached to the supporting member 610, the standard cartridge 104 is rotated and moved in the rotation mounting direction CD2 with the rotation restricting portion 661.

A-6. Detailed Configuration of Cartridge

Figure 6:
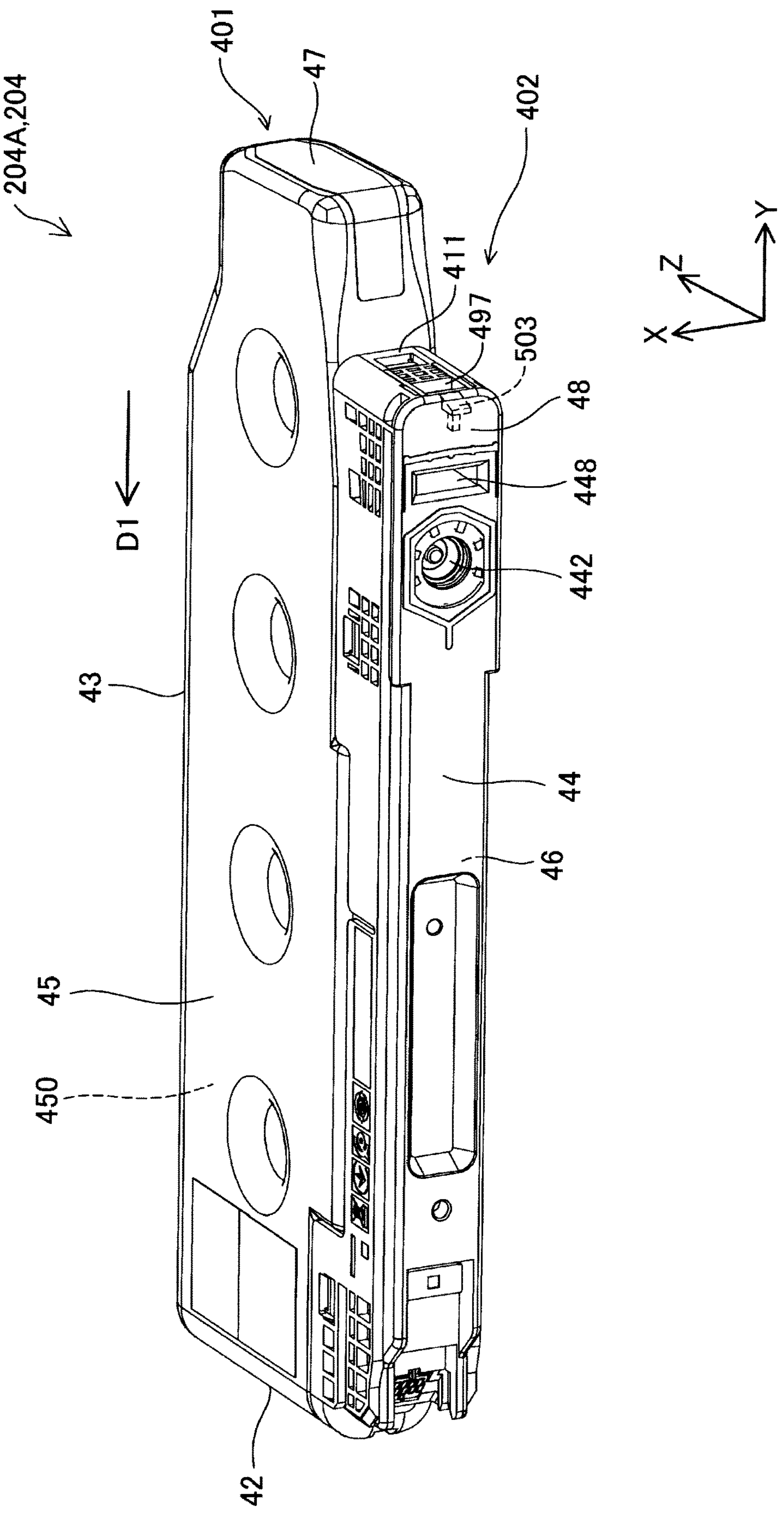
FIG. 6 is a perspective view of a special cartridge.

FIG. 6 is a perspective view of a special cartridge 204 corresponding to the first type standard cartridge 104A. Similarly to the standard cartridge 104, the special cartridge 204 as a cartridge also includes a first type special cartridge 204A and a second type special cartridge that are different from each other in liquid accommodating amount. In the present embodiment, the first type special cartridge 204A will be described, and the description of the second type special cartridge will be omitted.

Regarding to the first type special cartridge 204A, the Y direction is a depth direction, the Z direction is a height direction, and the X direction is a width direction. Regarding the external shape of the first type special cartridge 204A, the dimension in the Y direction is the largest, the dimension in the X direction and the dimension in the Z direction are the smallest in this order. Regarding the figures illustrating the first type special cartridge 204A, the X direction, the Y direction, and the Z direction are illustrated based on a state after insertion of the first type special cartridge 204A into the cartridge mounting unit 6 is completed.

As illustrated in FIG. 6, the first type special cartridge 204A includes a liquid container 401 that forms an upper wall 43, and the adapter portion 402 that forms a bottom wall 44. The adapter portion 402 is attached to the liquid container 401 through fitting. The adapter portion 402 is located below the liquid accommodating portion 450 in a mounted orientation in which the standard cartridge 104 is mounted to the printing apparatus 10. The liquid container 401 and the adapter portion 402 are formed of a synthetic resin. The liquid container 401 and the adapter portion 402 may be formed of the same material, or may be formed of different materials.

The external shape of the first type special cartridge 204A is a substantially rectangular parallelepiped shape. The liquid container 401 has the front wall 42, the rear wall 47, the upper wall 43, a first side wall 45, and a second side wall 46. The adapter portion 402 has the bottom wall 44. The walls 42, 43, 44, 45, 46, and 47 are also called surfaces 42, 43, 44, 45, 46, and 47, respectively. The front wall 42 faces the rear wall 47 in the Y direction along the insertion direction D1. The length of the rear wall 47 in the Z direction is shorter than the length of the front wall 42 in the Z direction. The upper wall 43 faces the bottom wall 44 in the Z direction. The Z direction is parallel to the central axis CA2 along a direction in which the liquid supply portion 442 extends. The first side wall 45 faces the second side wall 46 in the X direction.

In the mounted state, the front wall 42 is located on the insertion direction D1 side in which the first type special cartridge 204A is inserted into the cartridge mounting unit 6. The rear wall 47 is located on the opposite direction side of the insertion direction D1. The upper wall 43 is located on the +Z direction side and intersects with the front wall 42 and the rear wall 47. The bottom wall 44 is located on the −Z direction side, which is the direction of gravity side in the mounted state, and forms a coupling leading end surface in the rotation mounting direction CD2. That is, the bottom wall 44 is located on the rotation mounting direction CD2 side. The bottom wall 44 intersects with the front wall 42 and the rear wall 47. The first side wall 45 is located on the +X direction side, and the second side wall 46 is located on the −X direction side. The first side wall 45 and the second side wall 46 each intersect with the front wall 42, the rear wall 47, the upper wall 43, and the bottom wall 44.

The liquid container 401 has the liquid accommodating portion 450 and the liquid supply portion 442. The liquid accommodating portion 450 is an inner space of the liquid container 401. The liquid supply portion 442 is a cylindrical member that projects toward the adapter portion 402 side from the bottom wall of the liquid container 401. The liquid supply portion 442 is in communication with the liquid container 401. The liquid supply portion 442 is disposed in the adapter portion 402.

The adapter portion 402 has a box shape having an open face on the liquid container 401 side. The adapter portion 402 has, in addition to the bottom wall 44, a cartridge rear wall 411 and a facing surface 48. The cartridge rear wall 411 is substantially parallel to the rear wall 47. The facing surface 48 is on the same plane as the bottom wall 44. The facing surface 48 is located further on the +Y direction side than is the cartridge-side positioning portion 448. In the mounted state, the facing surface 48 faces the apparatus-side positioning portion 644 with an attachment 700 described later interposed therebetween.

The standard cartridge 104 has the standard release portion 503 that is not included in the special cartridge 204. As illustrated by the broken line in FIG. 6, the standard release portion 503 is disposed on the facing surface 48. The standard release portion 503 projects in the −Z direction from the facing surface 48. As described above, in the process of the standard cartridge 104 being mounted, the standard release portion 503 pushes the leading end portion 661*a* of the first rotation restricting portion 651 of the restricting mechanism 660 so as to release the restriction of the restricting mechanism 660. Since the standard release portion 503 projects from the facing surface 48, when the standard cartridge 104 falls or the like, the standard release portion 503 may be damaged. In this respect, since the special cartridge 204 does not have the standard release portion 503, there is no possibility that the standard release portion 503 and a coupling portion between the standard release portion 503 and the facing surface 48 are damaged.

As described above, the rotation restricting portion 661 interferes with an incompatible cartridge so as to restrict a movement of the incompatible cartridge to be mounted. Here, the incompatible cartridge includes a cartridge other than the standard cartridge 104 and the special cartridge 204, and the standard cartridge 104 that is not yet inserted into the insertion completion position. A cartridge other than the standard cartridge 104 and the special cartridge 204 is, for example, a cartridge whose dimension in the Y direction is longer or shorter than the dimension of the standard cartridge 104 in the Y direction.

A-7. Attachment

Figure 7:
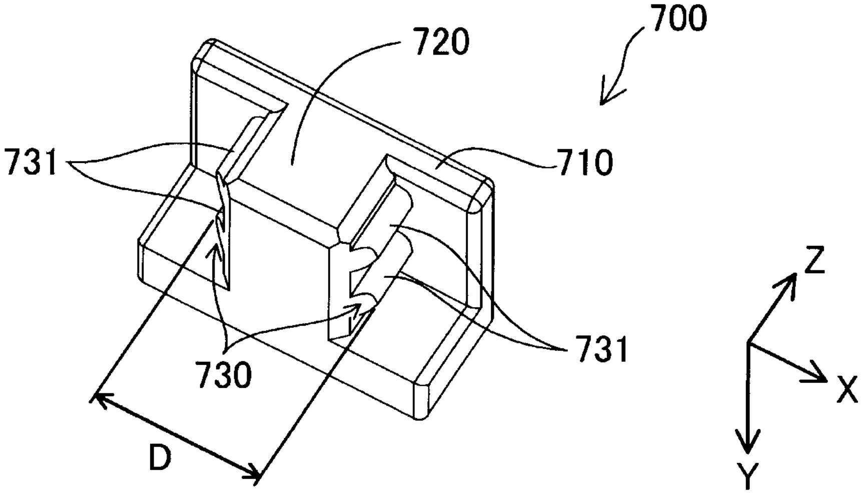
FIG. 7 is a first perspective view of an attachment.
Figure 8:
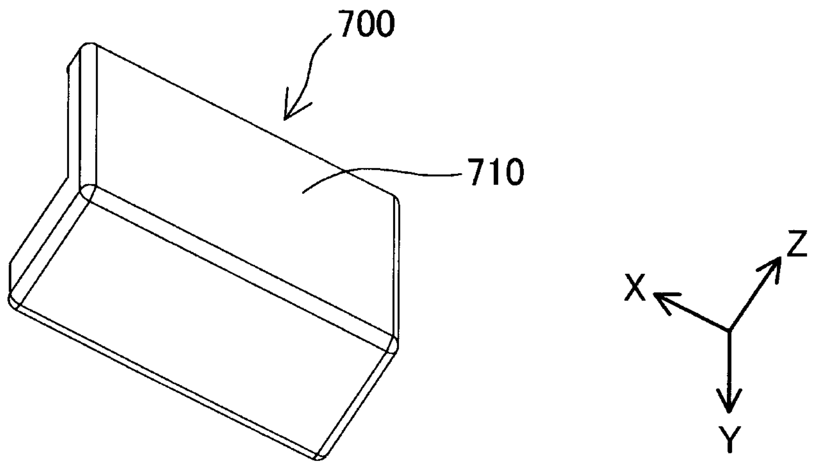
FIG. 8 is a second perspective view of the attachment.
Figure 9:
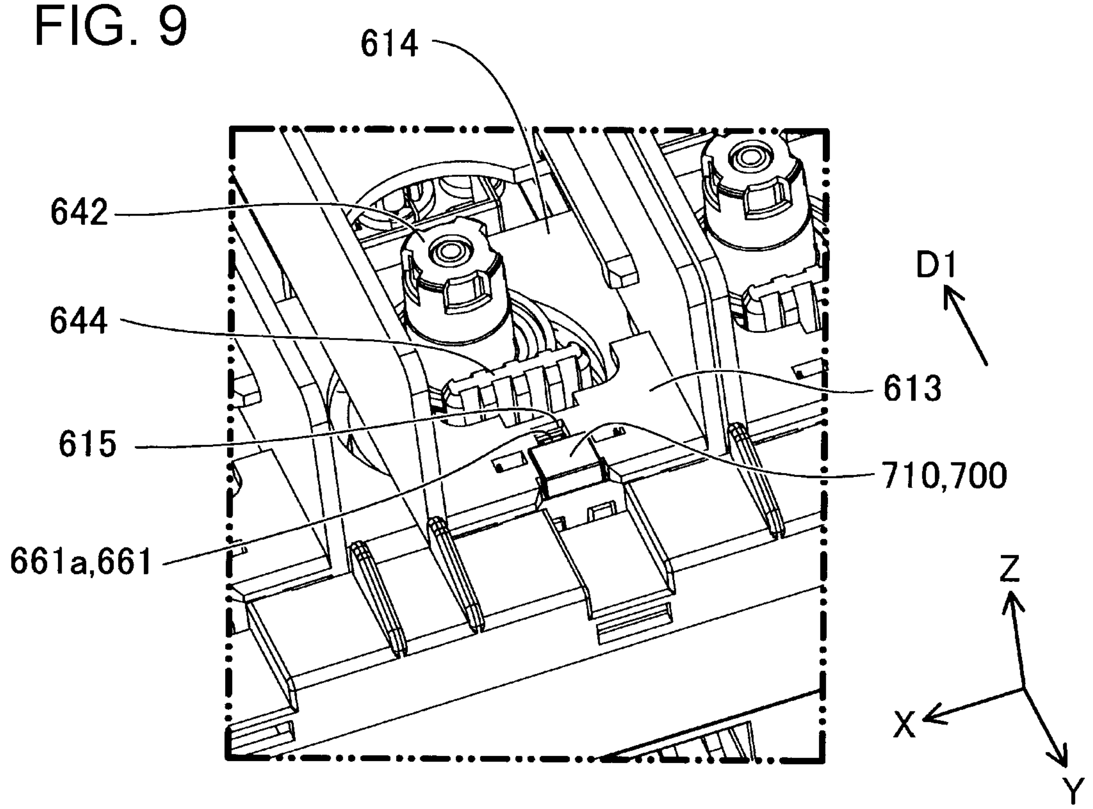
FIG. 9 is a perspective view of the cartridge mounting unit to which the attachment is mounted.
Figure 10:
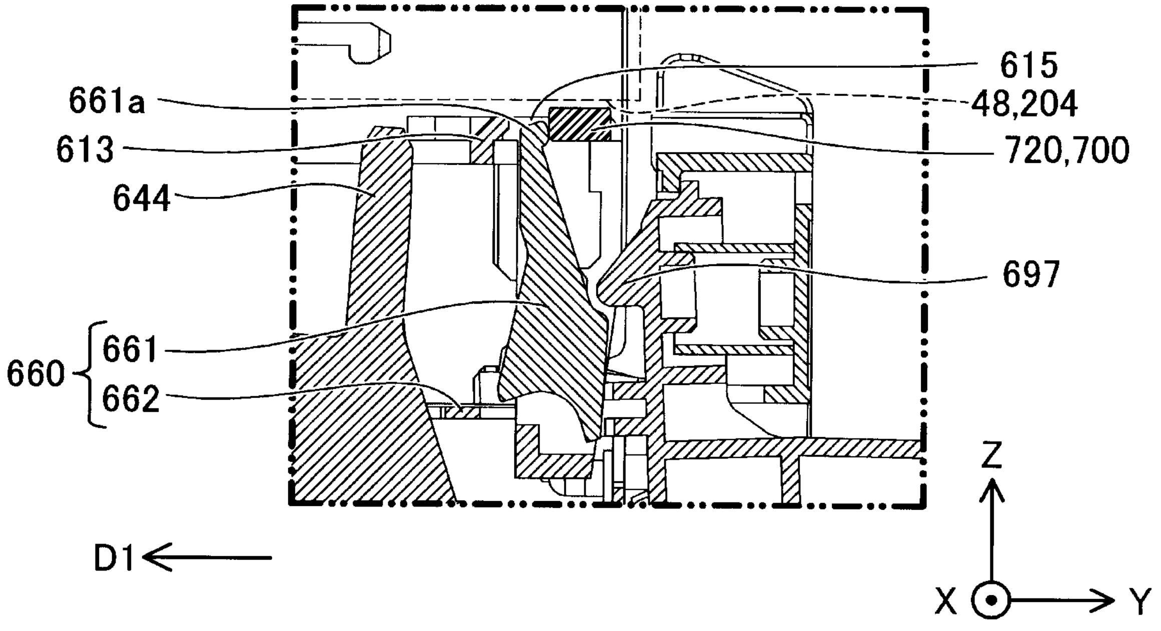
FIG. 10 is a sectional view of the cartridge mounting unit to which the attachment is mounted.

FIG. 7 is a first perspective view of the attachment 700. FIG. 8 is a second perspective view of the attachment 700. FIG. 9 is a perspective view illustrating a state in which the attachment 700 is mounted to the cartridge mounting unit 6. FIG. 10 is a sectional view illustrating a state in which the attachment 700 is mounted to the cartridge mounting unit 6. The attachment 700 is used for mounting the special cartridge 204 to the cartridge mounting unit 6. Regarding the figures illustrating the attachment 700, the X direction, the Y direction, and the Z direction are illustrated based on a state after insertion of the attachment 700 into the cartridge mounting unit 6 is completed.

As illustrated in FIG. 7, the attachment 700 made of a synthetic resin has a main body portion 710, a release portion 720, and a maintaining portion 730. The release portion 720 releases the restriction by the restricting mechanism 660 by pushing the leading end portion 661*a* as a part of the restricting mechanism 660 in the insertion direction D1. The maintaining portion 730 maintains the mounted state of the attachment 700 in cooperation with the cartridge mounting unit 6.

As illustrated in FIGS. 7 and 8, the main body portion 710 has a shape in which two flat plates extending in the X direction meet at right angles. As illustrated in FIG. 7, the release portion 720 has a substantially rectangular parallelepiped shape and is coupled to the main body portion 710. The release portion 720 is disposed at a central position of the main body portion 710 in the X direction. The maintaining portion 730 is coupled to a surface of the release portion 720 on the +X direction side, and a surface of the release portion 720 on the −X direction side.

The maintaining portion 730 has four pushing-in portions 731. When the attachment 700 is mounted to the cartridge mounting unit 6, each pushing-in portion 731 is pushed into the opening 615 along the insertion direction D1. Two pushing-in portions 731 project in the +X direction from the surface of the release portion 720 on the +X direction side. Two pushing-in portions 731 project in the −X direction from the surface of the release portion 720 on the −X direction side.

When the special cartridge 204 is mounted to the cartridge mounting unit 6, first, the attachment 700 is mounted to the cartridge mounting unit 6. Specifically, as illustrated in FIG. 9, the release portion 720 of the attachment 700 is inserted into the opening 615 in the −Y direction so that the attachment 700 is mounted. In the process of insertion, the release portion 720 of the attachment 700 illustrated in FIG. 7 pushes the leading end portion 661*a* of the rotation restricting portion 661 in the insertion direction D1. As a result, as illustrated in FIG. 10, the rotation restricting portion 661 is moved to the release position PO2, and thus the restriction by the restricting mechanism 660 is released. Here, a distance D illustrated in FIG. 7 from the leading ends on the +X direction side of the two pushing-in portions 731 disposed on the surface of the release portion 720 on the +X direction side to the leading ends on the −X direction side of the two pushing-in portions 731 disposed on the surface of the release portion 720 on the −X direction side is larger than the width of the opening 615 in the X direction. Therefore, in a state in which the attachment 700 is inserted into the opening 615, an internal force in a direction of expanding the opening 615 is generated in the pushing-in portions 731, and the mounted state of the attachment 700 to the cartridge mounting unit 6 is maintained.

Next, the special cartridge 204 is inserted in the insertion direction D1 into the cartridge mounting unit 6 to which the attachment 700 is mounted. Subsequently, the special cartridge 204 is rotated and moved in the rotation mounting direction CD2 and is mounted to the cartridge mounting unit 6. As illustrated in FIG. 10, in the mounted state, the facing surface 48 of the special cartridge 204 faces the attachment 700. Since the special cartridge 204 has the facing surface 48, the special cartridge 204 can be inserted into the cartridge mounting unit 6 to which the attachment 700 is mounted without interfering with the attachment 700. While the special cartridge 204 is rotated and moved in the rotation mounting direction CD2, the projecting portion 697 illustrated in FIG. 10 enters the cartridge recessed portion 497 illustrated in FIG. 6. As a result, the mounted state of the special cartridge 204 to the cartridge mounting unit 6 is maintained.

According to the first embodiment described above, since the special cartridge 204 does not have the standard release portion 503, the special cartridge 204 can be prevented from becoming unable to be mounted to the printing apparatus 10 due to deformation of the standard release portion 503. In addition, by using the attachment 700, the special cartridge 204 can be mounted to the printing apparatus 10. The attachment 700 has the release portion 720 and the maintaining portion 730. By the release portion 720, the restriction by the restricting mechanism 660 of the cartridge mounting unit 6 can be released. In addition, by the maintaining portion 730, the mounted state of the attachment 700 to the cartridge mounting unit 6 can be stably maintained. In addition, the release portion 720 can release the restriction by the restricting mechanism 660 by pushing the leading end portion 661*a* in the insertion direction D1.

In addition, since the maintaining portion 730 has the pushing-in portions 731, the mounted state of the attachment 700 to the cartridge mounting unit 6 can be stably maintained. In addition, since the special cartridge 204 has the facing surface 48, the special cartridge 204 can be inserted into the cartridge mounting unit 6 to which the attachment 700 is mounted without interfering with the attachment 700. In addition, the special cartridge 204 has the facing surface 48, compared to the standard cartridge 104 having the standard release portion 503 projecting from the facing surface 48, a shock due to falling is less likely to be received. In addition, the special cartridge 204 has the cartridge recessed portion 497 that is engaged with the projecting portion 697. As a result, the mounted state of the special cartridge 204 to the cartridge mounting unit 6 can be maintained.

B. Second Embodiment

A second embodiment is different from the first embodiment in shape of an attachment 2700. The same components as the above-described first embodiment will be denoted by the same reference numerals, and detailed description thereof will be appropriately omitted.

Figure 11:
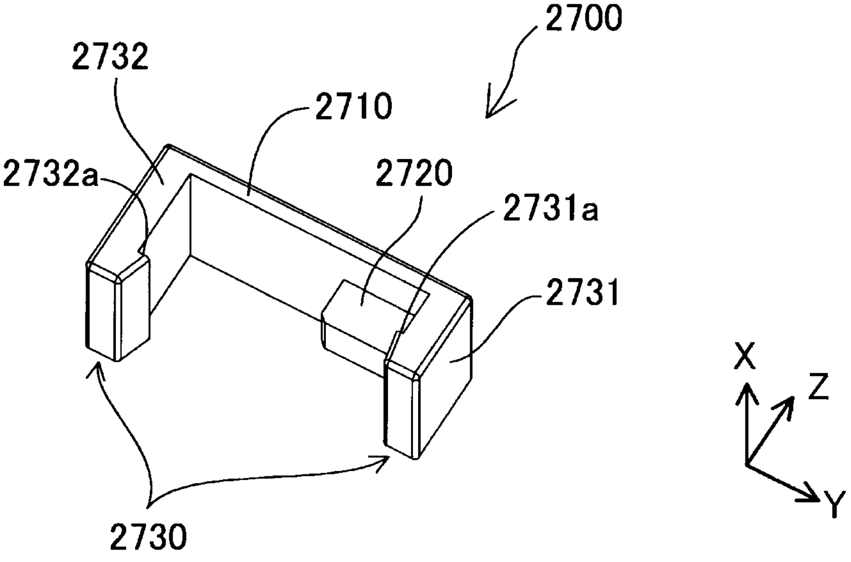
FIG. 11 is a first perspective view of an attachment according to a second embodiment.
Figure 12:
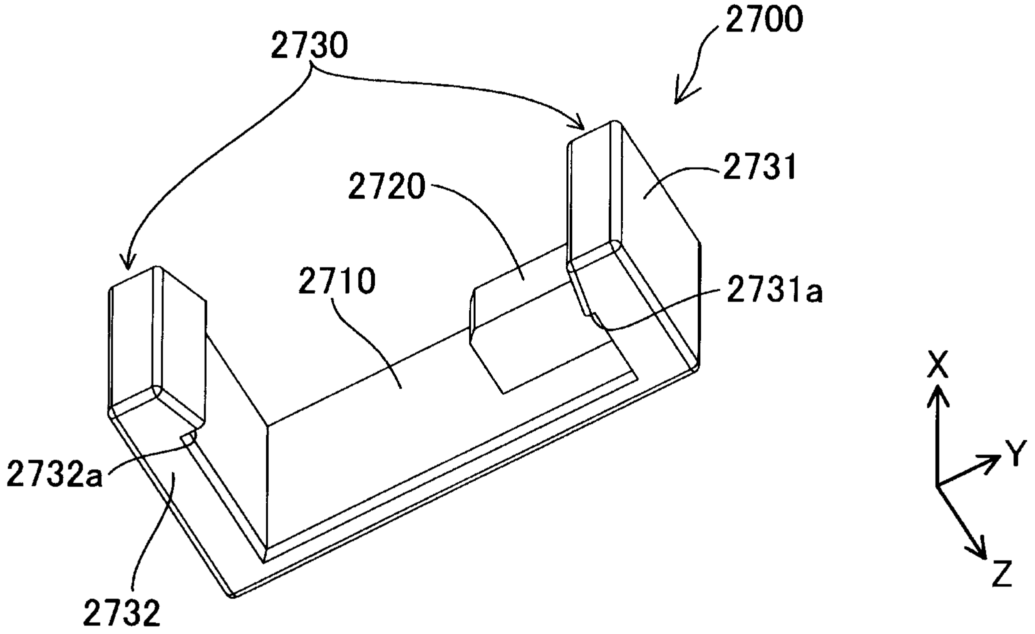
FIG. 12 is a second perspective view of the attachment according to the second embodiment.
Figure 13:
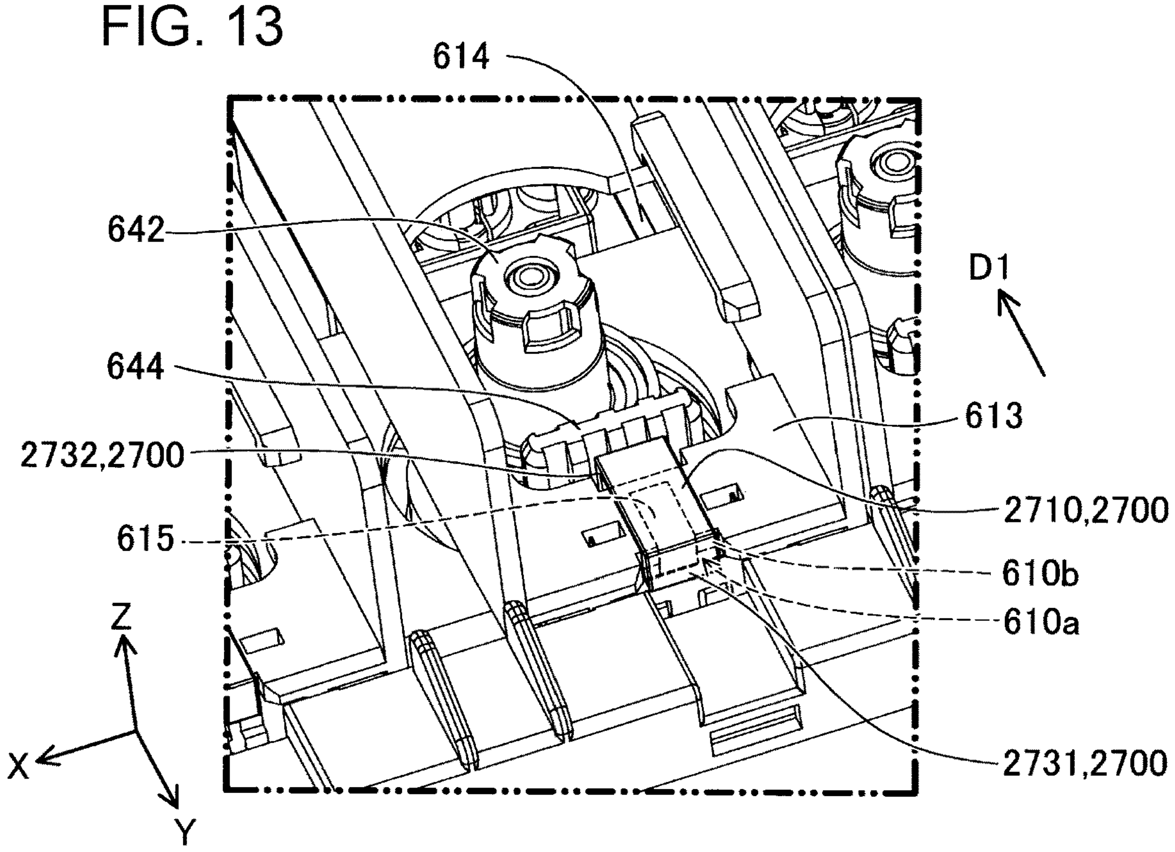
FIG. 13 is a perspective view of the cartridge mounting unit to which the attachment according to the second embodiment is mounted.
Figure 14:
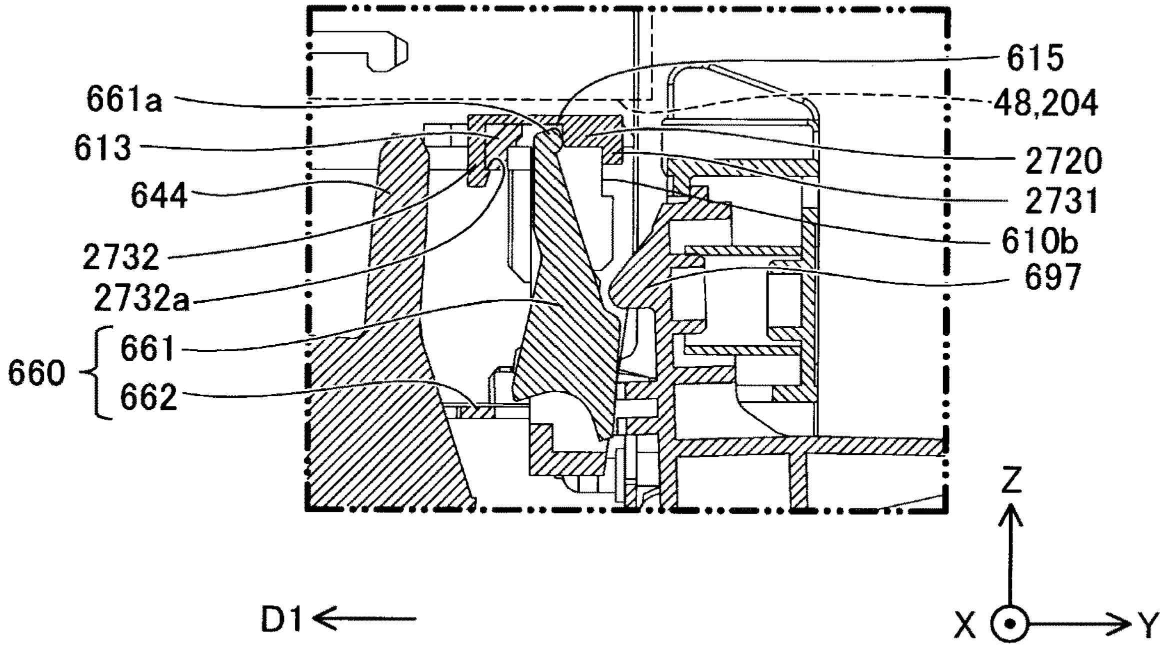
FIG. 14 is a sectional view of the cartridge mounting unit to which the attachment according to the second embodiment is mounted.

FIG. 11 is a first perspective view of the attachment 2700. FIG. 12 is a second perspective view of the attachment 2700. FIG. 13 is a perspective view illustrating a state in which the attachment 2700 is mounted to the cartridge mounting unit 6. FIG. 14 is a sectional view illustrating a state in which the attachment 2700 is mounted to the cartridge mounting unit 6. Regarding the figures illustrating the attachment 2700, the X direction, the Y direction, and the Z direction are illustrated based on a state after insertion of the attachment 2700 into the cartridge mounting unit 6 is completed.

As illustrated in FIGS. 11 and 12, the attachment 2700 has a main body portion 2710, a release portion 2720, and a maintaining portion 2730. The main body portion 2710 is a flat plate extending in the −Y direction. The release portion 2720 has a substantially rectangular parallelepiped shape. The release portion 2720 is coupled to the main body portion 2710 and a first claw portion 2731 described later. The maintaining portion 2730 is disposed at each end portion of the main body portion 2710 in the Y direction. The maintaining portion 2730 has the first claw portion 2731 and a second claw portion 2732 as claw portions. The first claw portion 2731 is substantially vertically erected from an end portion on the +Y direction side of the main body portion 2710. The second claw portion 2732 is substantially vertically erected from an end portion on the −Y direction side of the main body portion 2710. A step 2731*a* is formed on the surface on the −Y direction side of the first claw portion 2731. The step 2731*a* faces the main body portion 2710 in the Z direction. Similarly, a step 2732*a* is formed on the surface on the +Y direction side of the second claw portion 2732. The step 2732*a* faces the main body portion 2710 in the Z direction.

As illustrated in FIG. 13, in the attachment 2700, the main body portion 2710 is mounted to be substantially parallel to the main wall 613. Specifically, first, as illustrated in FIG. 14, the attachment 2700 is moved in the insertion direction D1 so that the release portion 2720 pushes the leading end portion 661*a* of the rotation restricting portion 661 in the insertion direction D1. The attachment 2700 is moved until the step 2731*a* of the first claw portion 2731 comes into contact with a supporting member step 610*a* included in the supporting member 610 illustrated in FIG. 13. Next, the first claw portion 2731 and the second claw portion 2732 are engaged with the supporting member 610.

Specifically, the step 2731*a* of the first claw portion 2731 illustrated in FIG. 11 is engaged with the supporting member step 610*a* included in the main wall 613 illustrated in FIG. 13. The supporting member step 610*a* is formed in an end portion of the main wall 613 in the +Y direction. In more detail, the main wall 613 has an end surface 610*b* whose normal vector is parallel to the +Y direction. The supporting member step 610*a* is disposed in the −Z direction of the end surface 610*b*, and is formed on a boundary of a surface behind the end surface 610*b* in the −Y direction. The step 2732*a* of the second claw portion 2732 illustrated in FIG. 14 is engaged with the main wall 613. In more detail, a surface of the main wall 613 facing down comes into contact with the step 2732*a*, and the second claw portion 2732 is engaged with the main wall 613. As a result, the mounted state of the attachment 2700 to the cartridge mounting unit 6 is maintained.

According to the second embodiment described above, since the maintaining portion 2730 has the first claw portion 2731 and the second claw portion 2732 that are engaged with the main wall 613, the mounted state of the attachment 2700 to the cartridge mounting unit 6 can be stably maintained.

C. Other Embodiments

C1 In the above-described first embodiment, the maintaining portion 730 has the pushing-in portions 731. In the above-described second embodiment, the maintaining portion 2730 has the first claw portion 2731 and the second claw portion 2732. As another embodiment, a maintaining portion may have both of a pushing-in portion and a claw portion.

C2 The present disclosure is not limited to an ink jet printer and an ink cartridge thereof, and is applicable to an appropriate printing apparatus that ejects a liquid other than ink and a cartridge thereof. For example, the present disclosure is applicable to the following various printing apparatuses and cartridges thereof. 1. An image recording apparatus such as a facsimile apparatus, or the like 2. A printing apparatus that ejects a color material used for manufacturing a color filter for an image display apparatus such as a liquid crystal display 3. A printing apparatus that ejects an electrode material used for forming an electrode of an organic electro luminescence (EL) display, a field emission display (FED), and the like 4. A printing apparatus that ejects a liquid containing a biological organic material used for manufacturing a biochip 5. A sample printing apparatus as a precision pipette 6. A printing apparatus of a lubricating oil 7. A printing apparatus of a resin liquid 8. A printing apparatus that ejects a lubricating oil to precision machinery such as a watch or camera with pinpoint precision 9. A printing apparatus that ejects a transparent resin liquid such as an ultraviolet curable resin liquid onto a substrate to form a micro-hemispherical lens (optical lens) or the like used for an optical communication element or the like 10. A printing apparatus that ejects an acidic or alkaline etchant for etching a substrate or the like 11. A printing apparatus including a liquid ejecting head that discharges a minute amount of other appropriate liquid droplets Note that the "liquid droplets" represent liquid states discharged from a printing apparatus, the liquid states including granular, tear-like, and thread-like shapes with trails. In addition, the "liquid" mentioned herein may be any material that can be ejected by a printing apparatus. For example, the "liquid" may be a material in a state where the material has a liquid phase, and liquid state materials with high or low viscosities, sol, gel water, liquid-state materials such as inorganic solvents, organic solvents, solutions, liquid resin, and liquid metal, and the like belong to the "liquid". In addition to liquids as a state of a material, a material in which particles of functional material made of solids such as pigments or metallic particles are dissolved, dispersed, or mixed with the solvent also belongs to the "liquid". As a representative example of the liquid, there is the ink described in the above embodiments or liquid crystals. Here, the ink may include various kinds of liquid-like compositions such as general water-based ink, oil-based ink, gel ink, and hot-melt ink.

D. Other Aspects

The present disclosure is not limited to the above-described embodiments and can be realized with various configurations within the scope of the present disclosure without departing from the gist thereof. For example, technical features in the embodiments corresponding to the technical features in the aspects described below can be appropriately replaced or combined to solve some or all of the above-described problems or achieve some or all of the above-described advantages. In addition, the technical features can be appropriately deleted unless the technical features are described as essential in the present specification.

1. According to a first aspect of the present disclosure, an attachment that is detachably mounted to a cartridge mounting unit of a printing apparatus is provided. The cartridge mounting unit includes a liquid introduction portion that receives a liquid, and a restricting mechanism that restricts a rotation movement of a incompatible cartridge in a rotation mounting direction to be mounted by interfering with the incompatible cartridge, and the attachment includes a release portion that releases restriction by the restricting mechanism by pushing a part of the restricting mechanism in a pre-determined insertion direction, and a maintaining portion that maintains a mounted state of the attachment in cooperation with the cartridge mounting unit. According to the aspect, by using the attachment, a cartridge that does not integrally have a mechanism for releasing the restriction by the restricting mechanism can be mounted to the cartridge mounting unit. Since this cartridge does not integrally have a mechanism for releasing the restriction by the restricting mechanism, the possibility of deformation by a shock due to falling or the like can be reduced. By the release portion of the attachment, the restriction by the restricting mechanism of the cartridge mounting unit can be released. In addition, by the maintaining portion, the mounted state of the attachment to the cartridge mounting unit can be stably maintained.

2. In the attachment of the above-described aspect, while the restricting mechanism has an apparatus contact portion, and a rotation restricting portion that has a leading end portion as a part of the restricting mechanism and is configured to be moved between a restricting position where the rotation restricting portion comes into contact with the apparatus contact portion and restricts the rotation movement and a release position where the rotation restricting portion does not come into contact with the apparatus contact portion such that the rotation movement occurs, and the cartridge mounting unit further has a main wall that has an opening through which the leading end portion is exposed, the release portion may push the leading end portion in the insertion direction and moves the rotation restricting portion from the restricting position to the release position to release the restriction by the restricting mechanism. According to the aspect, since the rotation restricting portion is moved from the restricting position to the release position, in a mechanism in which the restriction by the restricting mechanism is released, the release portion can release the restriction by the restricting mechanism by pushing the leading end portion in the insertion direction.

3. In the attachment of the above-described aspect, the maintaining portion may have a pushing-in portion that is pushed into the opening in the insertion direction. According to the aspect, the mounted state of the attachment to the cartridge mounting unit can be stably maintained.

4. In the above-described attachment, the maintaining portion may have a claw portion that is engaged with the main wall. According to the aspect, the mounted state of the attachment to the cartridge mounting unit can be stably maintained.

5. A printing system including the attachment of the above-described aspect, the printing apparatus having the cartridge mounting unit, and a cartridge that is detachably mounted to the cartridge mounting unit may be provided. After the cartridge is inserted into the cartridge mounting unit to which the attachment is mounted in the insertion direction, the cartridge is mounted to the cartridge mounting unit by being rotated and moved in the rotation mounting direction, and has a facing surface that faces the attachment in a mounted state of the cartridge. According to the aspect, since the cartridge has the facing surface, compared to a cartridge having a structure projecting from the facing surface for releasing the restriction by the restricting mechanism, a shock due to falling is less likely to be received.

6. In the above-described printing system, the cartridge may further have a cartridge rear wall that intersects with the facing surface, and a cartridge recessed portion that is recessed from the cartridge rear wall, and the cartridge mounting unit may further have a projecting portion that enters the cartridge recessed portion in a process of the cartridge being rotated and moved in the rotation mounting direction. According to the aspect, since the projecting portion enters the cartridge recessed portion, the mounted state of the cartridge into the cartridge mounting unit can be maintained.

The present disclosure can be achieved in forms of a method for manufacturing a cartridge, a printing system, and the like other than the above-described forms.

What is claimed is:

1. An attachment that is detachably mounted to a cartridge mounting unit of a printing apparatus, the cartridge mounting unit including a liquid introduction portion that receives a liquid, and a restricting mechanism that restricts a rotation movement of an incompatible cartridge in a rotation mounting direction to be mounted by interfering with the incompatible cartridge, the attachment comprising:

a release portion that releases restriction by the restricting mechanism by pushing a part of the restricting mechanism in a pre-determined insertion direction; and a maintaining portion that maintains a mounted state of the attachment in cooperation with the cartridge mounting unit.

2. The attachment according to claim 1, wherein while the restricting mechanism has an apparatus contact portion, and a rotation restricting portion that has a leading end portion as a part of the restricting mechanism and is configured to be moved between a restricting position where the rotation restricting portion comes into contact with the apparatus contact portion and restricts the rotation movement and a release position where the rotation restricting portion does not come into contact with the apparatus contact portion such that the rotation movement occurs, and the cartridge mounting unit further has a main wall that has an opening through which the leading end portion is exposed, the release portion pushes the leading end portion in the insertion direction and moves the rotation restricting portion from the restricting position to the release position to release the restriction by the restricting mechanism.

3. The attachment according to claim 2, wherein the maintaining portion has a pushing-in portion that is pushed into the opening in the insertion direction.

4. The attachment according to claim 2, wherein the maintaining portion has a claw portion that is engaged with the main wall.

5. A printing system comprising:

the attachment according to claim 1;

the printing apparatus having the cartridge mounting unit; and a cartridge that is detachably mounted to the cartridge mounting unit, wherein after the cartridge is inserted into the cartridge mounting unit to which the attachment is mounted in the insertion direction, the cartridge is mounted to the cartridge mounting unit by being rotated and moved in the rotation mounting direction, and has a facing surface that faces the attachment in a mounted state of the cartridge.

6. The printing system according to claim 5, wherein the cartridge further has a cartridge rear wall that intersects with the facing surface, and a cartridge recessed portion that is recessed from the cartridge rear wall, and the cartridge mounting unit further has a projecting portion that enters the cartridge recessed portion in a process of the cartridge being rotated and moved in the rotation mounting direction.

* * * * *